US012520237B2

(12) United States Patent
Voit et al.

(10) Patent No.: US 12,520,237 B2
(45) Date of Patent: Jan. 6, 2026

(54) PREDICTING MOBILITY PATHS WITH MINIMALLY SELECTIVE TRANSCEIVER ENERGIZATION

(71) Applicant: Cisco Technology, Inc., San Jose, CA (US)

(72) Inventors: Eric A. Voit, Bethesda, MD (US); Kasi R. Nalamalapu, Pleasanton, CA (US); Avinash Kalyanaraman, San Francisco, CA (US); Ruifeng Xue, Shanghai (CN); Carlos Pignataro, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 443 days.

(21) Appl. No.: 18/309,974

(22) Filed: May 1, 2023

(65) Prior Publication Data

US 2024/0373341 A1 Nov. 7, 2024

(51) Int. Cl.
*H04W 4/00* (2018.01)
*G01S 7/00* (2006.01)
*G01S 13/72* (2006.01)
*H04W 52/02* (2009.01)

(52) U.S. Cl.
CPC ......... *H04W 52/0206* (2013.01); *G01S 7/006* (2013.01); *G01S 13/726* (2013.01)

(58) Field of Classification Search
CPC ........ G06F 3/017; G06F 1/163; G06F 1/3265; A61B 5/021; G01S 13/89; G01S 7/006; G01S 13/726; H04W 52/0206
See application file for complete search history.

(56) References Cited

U.S. PATENT DOCUMENTS

| 2015/0245280 A1 | 8/2015 | Zhou et al. |
| 2018/0310219 A1 | 10/2018 | Karimi-Cherkandi et al. |
| 2020/0125158 A1* | 4/2020 | Giusti ..................... G06F 3/012 |

(Continued)

OTHER PUBLICATIONS

Krumm, et al., "Locadio: Inferring Motion and Location From Wi-Fi Signal Strengths," Microsoft, Mobiquitous 2004 (First Annual International Conference on Mobile and Ubiquitous Systems:Networking and Services), Aug. 22-26, 2004.

*Primary Examiner* — Phuoc H Doan
(74) *Attorney, Agent, or Firm* — Rutan & Tucker, LLP; Ravi Mohan; Marc McClain

(57) ABSTRACT

Various methods, systems, and/or processes are described herein that can operate on a minimally energized power level to detect motion and paths of motion within an environment. A device suitable for carrying out these operations may include an energization optimization logic which can be responsible for selecting a floorplan, identifying access points associated with the floorplan, determining identities, such as persons, located within the floorplan, and tracking their motion. Once this information is gathered, the logic determines a reduced power configuration and passes it to various access points in the floorplan area to reduce the energy consumption based on the configuration. This allows for energy optimization while still maintaining the tracked motion of the identities within the floorplan. The logic allows for efficient power usage in areas with high traffic flow, while still maintaining the quality of service for the identities within the space, which can change dynamically over time.

20 Claims, 9 Drawing Sheets

(56) References Cited

U.S. PATENT DOCUMENTS

2021/0103348 A1* 4/2021 Jeppsson .............. G06F 3/04845
2021/0126912 A1 4/2021 Maclean et al.
2022/0279316 A1 9/2022 Klinkner et al.

* cited by examiner

PREDICTING MOBILITY PATHS WITH MINIMALLY SELECTIVE TRANSCEIVER ENERGIZATION

The present disclosure relates to network devices. More particularly, the present disclosure relates to configuring minimally selecting transceiver energizations suitable for tracking and predicting the motion of objects within a particular area.

BACKGROUND

Understanding where people are (or not) in an environment, such as an office, is often desired, even when they don't have any Radio or SSID associations. Different floorplans such as these office spaces, often utilize motion sensors to understand the layout of an environment and to gather data about potential users and their movements within that environment. However, not every environment has motion sensors deployed and may be cost prohibitive to add. However, many environments already have wireless network systems in place with a plurality of access points. Thus, wireless network systems may be configured to act as motion detectors within an environment.

To achieve motion detection, the access points within a wireless network system can have multiple frequency bands of transceivers. Often, these transceivers are in an always on state. However, there are drawbacks to keeping wireless network systems, including access points in an always-on state. Mainly, keeping a wireless network system always on can lead to increased energy costs. Running a wireless network system continuously on all frequency bands can use a lot of energy, so turning off transceivers or access points within the wireless network during non-working hours or other periods of decreased usage can help save on energy consumption.

Additional problems with keeping a wireless networking system always on include providing a larger attack surface for bad actors to exploit, creating interference between other wireless devices, increased maintenance, and upkeep, etc. However, minimum service level agreements (SLAs) may be in place and/or user experiences must be maintained if power reduction steps are to be taken.

BRIEF DESCRIPTION OF DRAWINGS

The above, and other, aspects, features, and advantages of several embodiments of the present disclosure will be more apparent from the following description as presented in conjunction with the following several figures of the drawings.

Figure 1:
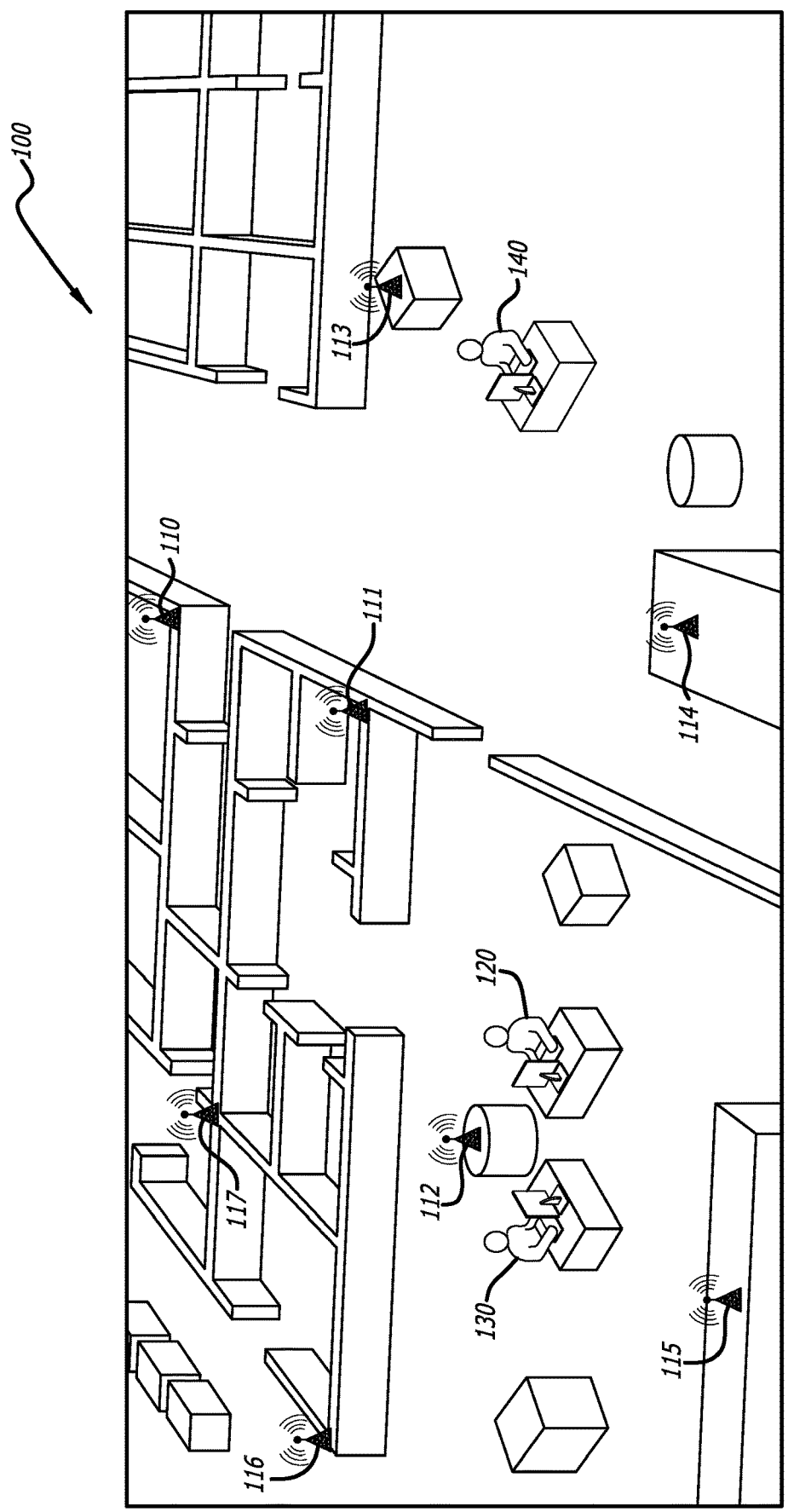
FIG. 1 is a conceptual illustration of a floorplan with a plurality of access points in accordance with various embodiments of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the problems described above, devices and methods are discussed herein that utilize a wireless network to track and predict the motion of one or more identities (such as persons) within a floorplan environment while utilizing a minimal amount of energization within the wireless network devices. In this way, the wireless network devices can be configured to operate using reduced energy consumption. As described in more detail below, wireless access points deployed in an environment transmit wireless signals from a plurality of transceivers that can be configured at different frequency bands. These transceivers can be higher-frequency transceivers (e.g., 5 GHZ) or lower-frequency (e.g., 2.4 GHz). In many embodiments, the transceivers are configured to provide Wi-Fi signal throughput, however the access points may also include other transceivers, such as those used only for monitoring, wake-up functions, or those using other communication protocols.

These transceivers are configured to allow for wireless network communication with a variety of devices. However, the network devices may also be configured to receive signals reflected off of objects within the environment. By processing these signals, the access points, or another energization optimization device (EOD) (i.e., controller) that can direct these operations, a number of objects, persons, and/or identities can be identified and tracked within the environment. Additionally, those skilled in the art will recognize that "transceivers" may also be understood to be or called "antennas," "radios," and the like. Transceivers are often understood in the art to be a device that combines the functions of a transmitter and a receiver in a single unit. However, certain embodiments may have these functions operated separately and/or by separate devices.

Furthermore, by processing this same data over time, motion may be tracked, without the need for dedicated motion tracking hardware. The tracking of motion can be done through machine learning or other similar methods. Motion tracking may not only predict motion based on the reflected signals but may also pull data from external sources to make predictions on the likely movements of people within a floorplan environment. Once the motion of one or more identities within an environment is known, decisions on which access points and/or frequency bands of transceivers to keep powered on may be made.

For example, access points with no tracked users within the area and no network traffic may be a candidate to power down, or at least power-off a higher-frequency transceiver. However, new people may enter the floorplan area being monitored, so access points next to entrances and exits may remain powered on to track for new people, etc. The entire set of decisions on which access points to power can be gathered into a reduced power configuration that can be distributed to all access points within a floorplan. This reduced power configuration may be dynamically changed though in response to periods of time elapsing or certain events happening such as detecting motion.

In a variety of embodiments, the reduced power configuration can be applied to and/or utilized by various network devices such as, but not limited to, access points in order to minimize the overall energy usage of the devices. The reduced power configuration can allow for reduced energy consumption during operation of these various network devices. The amount of reduced energy consumption can vary depending on various factors such as time of day, current operating environment, traffic within the floorplan, etc.

In many embodiments, an access point may have a higher-frequency transceiver that is powered off and lower-frequency transceiver that is kept on to detect motion. When motion is detected, the higher-frequency transceiver may be powered on to verify the detected motion. Upon verification of the motion detection, the access point can transmit a signal to an EOD or other device responsible for generating or otherwise updating the reduce power configuration for the floorplan. This may trigger a reevaluation of the configuration and the generation of a new configuration that can be distributed to the plurality of access points within the floorplan. Additional methods of optimizing the reduced energization of access points within a floorplan are described in more detail below.

Additionally, it is recognized that the terms "power" and "energy" are often used interchangeably in many colloquial settings but have distinct differences. Specifically, energy is accepted as the capacity of a system or device to do work (such as in kilowatt-hours (kWh)), while power is the rate at which energy is transferred (often in watts (W)). Power represents how fast energy is being used or produced. With this in mind, it should be understood that various elements of the present disclosure may utilize common terms like "high-power transceivers," "power grids," power source," "power consumption," and "lower power usage" when describing energy delivery and utilization, even though those skilled in the art will recognize that those elements are delivering or processing energy (specifically electricity) at a certain rate of power. References to these terms are utilized herein specifically to increase the ease of reading.

In additional embodiments, the access points (APs) may have dual-band/multi-band wake-up radios and a simple 'tone' to detect human presence. Motion sensors can be used as a 'first-level filter' to avoid false positives. Existing systems and devices, such as access control and attendance systems, cameras on video conference systems, and internet protocol (IP) phones can be integrated into the echo system to sense people's presence and movement paths. It is also contemplated that endpoints may be utilized as sensors and that establishing one or more identities via reflection profiles computed by APs are also possible. In further embodiments, the endpoints can provide supplementary info, and Wake-On-LAN can be utilized to provide identity continuity when transferring signals along a predicted path of movement of an identity. Additionally, some embodiments may be configured to control lighting and/or HVAC systems based on the tracked movement within the floorplan environment.

Identities can also be determined and maintained through a variety of data. For example, companies have an access control and attendance system. When employees tap their employee cards, the Wi-Fi controller can obtain employee identity-related info, such as seat location, MAC addresses of commonly used devices like cellphones and laptops, so as to easily predict their movement paths inside the company and which corresponding APs should operate.

However, utilizing endpoints may not always be optimal. In a number of embodiments, it may be desired to characterize devices in an existing space by policy or in discovery. Often, there may be four types or categories of endpoints: always-on security sensors, sensors with minimal power draw, endpoints that can also function as sensors, and endpoints where power draw is larger than the benefit of sensor usage. In certain embodiments, two profiles may be utilized: one for minimum people/motion-endpoint sensing and the other for optimizing discovery based on expected flow. This approach may leverage existing user context to sense or imply by utilizing available data such as badge-door access or AI camera face detection access. This will help in integrating sensors as much as possible and reducing the need for additional endpoints.

In various embodiments, using existing endpoints as sensors may be utilized for detecting presence or movement. A first approach may be to characterize devices as always-on security sensors, sensors of minimal power draw, or endpoints that can be used as sensors when woken up periodically. A second approach could involve using existing user context to sense or imply presence or movement, such as badge-door access or AI camera face detection. In additional embodiments, endpoints may be owned by an enterprise which can provide supplementary information. Additionally, Wireless Wake-On-LAN can be used in many embodiments to track people in an area and establish moving an identity through facial recognition or reflection profiles computed by APs.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a conceptual illustration of a floorplan 100 with a plurality of access points in accordance with various embodiments of the disclosure is shown. In many embodiments, a floorplan 100 can be selected for predicting mobility paths with a minimum selection of transceiver energization of various access points. Although the floorplan 100 depicted in the embodiment of FIG. 1 is an office environment, it is contemplated that a floorplan may be any environment that includes a plurality of access points distributed throughout an area. In additional embodiments, an area may have multiple floorplans and access points may be associated with multiple floorplans. Indeed, in certain embodiments, a floorplan may be defined as a collection of access points and the area that those access points cover.

In the embodiment depicted in FIG. 1, the floorplan 100 has a first access point 110 at an entranceway to the area. Likewise, a second access point 111 can be placed centrally within the floorplan 100. Within the floorplan 100, three people are depicted working at desk workstations. The first person 120 and second person 130 are working next to a third access point 112. A third person 140 is working next to a fourth access point 113. Additional access points are distributed throughout the floorplan 100 to provide additional wireless signal coverage including a fifth access point 114, a sixth access point 115, a seventh access point 116, and an eighth access point 117.

Traditionally, all access points may be fully powered and operating throughout the day. However, within the embodiment of FIG. 1, the first person 120 and second person 130 may be fully served by the third access point 112. Similarly, the third person 140 may be fully served by the connection provided by the fourth access point 113. Therefore, as described in more detail below, a number of access points may be selectively powered down or de-energized. This powering down may include powering down the entire unit to a sleep mode but may also include powering down one or more transceivers within the access point. In a number of embodiments, the access points can be configured with multiple transceivers that are configured for different bands of usage. These bands of usage may be a higher-frequency band, or a lower-frequency band. The higher-frequency band may provide enhanced signal readings and data transfer throughput, but often require additional energy to operate at a similar range compared to a transceiver configured for use on a lower-frequency band.

Powering down access points and/or their transceivers can provide significant savings in overall electricity usage within the floorplan 100. However, powering down these elements within a network can cause problems when additional traffic suddenly enters the floorplan 100. For example, additional people may walk into the floorplan 100 from an outside area. If the first access point 110 was powered down into a sleep mode, there may be situations where the time it takes to wake from the sleep mode is too long to provide adequate coverage and/or service to the additional people. This can negatively affect service level agreements (SLAs) as well as the overall user experience. Thus, in a variety of embodiments, any powering down within the floorplan 100 should be weighed against the time it may take to sufficiently satisfy a sudden increase in network traffic.

As a result, in the embodiment depicted in FIG. 1, a potential minimal energization configuration may include operating the first access point 110 at a lower-power setting until it detects additional people entering the floorplan 100, which can trigger a higher-power setting. However, the second access point 111 may be powered off into a sleep mode because the third access point 112 is sufficiently serving the first person 120 and second person 130 while the fourth access point 113 is also sufficiently serving the third person 140. Therefore, the third access point 112 and the fourth access point 113 may be operating at full and normal capacity. The fifth access point 114, sixth access point 115, seventh access point 116, and eighth access point 117 may also power down into a sleep mode until one or more triggering events occurs to initiate a remeasurement of the state of the floorplan 100. Detecting these triggering events, such as motion, is described in more detail below.

Figure 2:
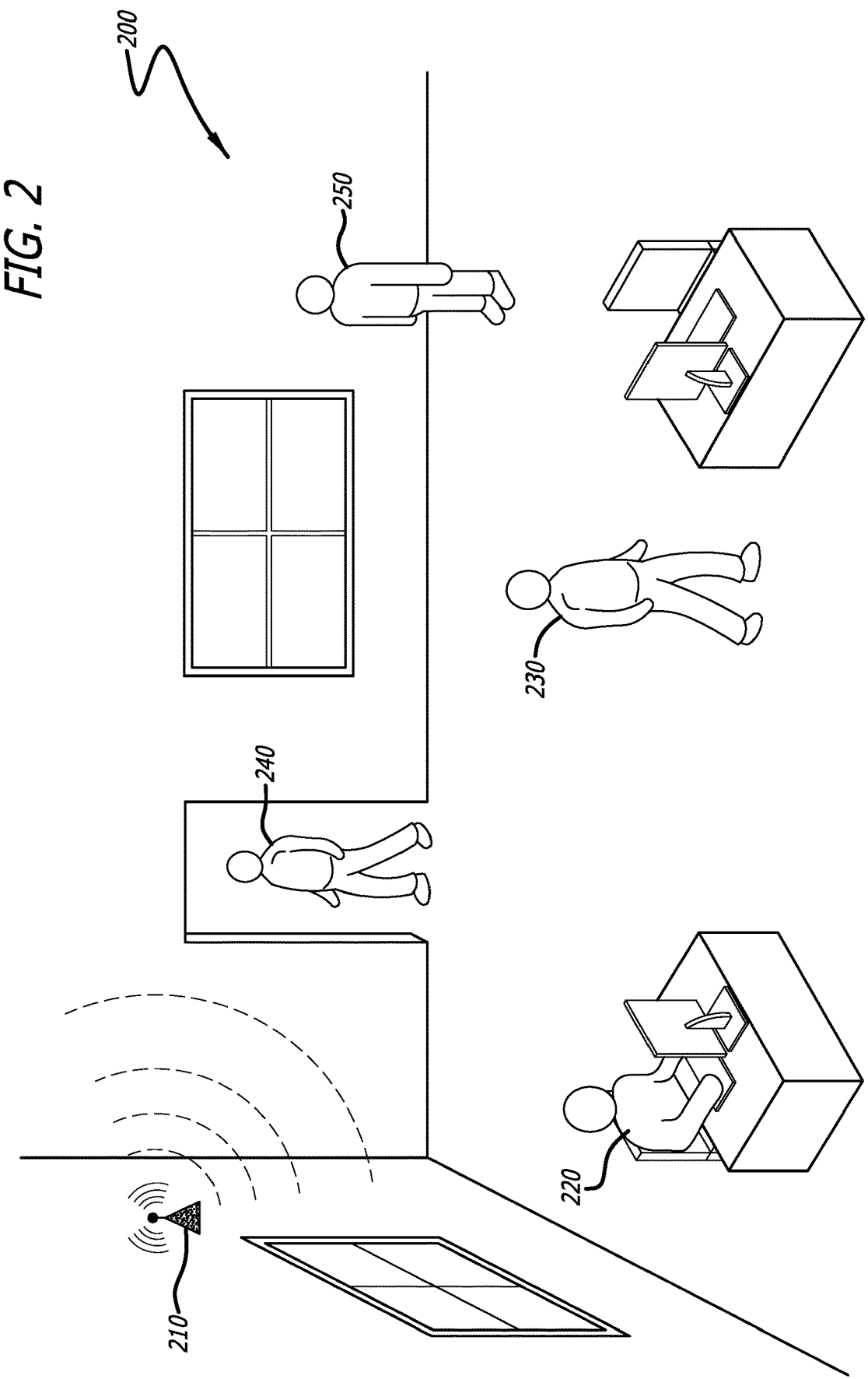
FIG. 2 is a conceptual illustration of a floorplan with an access point capable of identifying one or more identities with various motions in accordance with various embodiments of the disclosure.

Referring to FIG. 2, a conceptual illustration of a floorplan 200 with an access point 210 capable of identifying one or more identities with various motions in accordance with various embodiments of the disclosure is shown. While a configuration to minimize energy usage can be determined for a floorplan at a particular time, the environment that is within a floorplan 200 is often dynamically changing over time. The embodiment depicted in FIG. 2 highlights some of these changes, including the movement of identities within the environment.

In many embodiments, the floorplan 200 may include an access point 210 that is able to transmit and receive signals over multiple bandwidths across the entire floorplan area. These signals can be utilized for the wireless transfer of data between various devices and other devices on a network. Additionally, a number of identities, such as persons, may be within the floorplan 200. A first person 220 is depicted as sitting at a desk working on a computer that may be in communication with the access point 210 to deliver access to the internet. As long as that first person 220 continues to sit at the desk, there is often very little change to detect.

In more embodiments, a second person 230 may be walking to their desk to access the computer. As described in more detail below, the access point 210 can be configured to detect the motion of the second person 230 by analyzing various signal patterns being emitted and recaptured by a transceiver within the access point 210. The signals bounce off of a person in position differently than when they are in another position. If we can assume that the access point is stationary between the measurements, we can process the change in received signals to determine if movement is detected within the floorplan 200. This may be done by solely using signals emitted from the access point 210, without the need for a heat-sensing device or other movement/tracking sensors. Based on the movement of the second person 230 moving, a re-evaluation of the reduced power configuration may be triggered which can adjust one or more settings within the access point 210.

In further embodiments, re-evaluation of the reduced power configuration can be done in response to a new identity entering the room. In the embodiment depicted in FIG. 2, a third person 240 is entering the floorplan 200. The access point 210 may be configured to detect a new identity and either trigger a re-evaluation of the reduced power configuration, or send the data associated with the tracked motion/presence of the third person 240 to a separate device that can direct the access point 210 or additional access points to change one or more configurations. Such a device may be an energization optimization device (EOD) that may receive motion data and generate a reduced power configuration for a plurality of APs throughout a floorplan.

Similarly, each person within the floorplan 200 may be considered an identity. For example, in the embodiment depicted in FIG. 2, a fourth person 250 may be detected by the access point 210. However, in various embodiments, the signals emitted and received back by the access point 210 may be sufficient to identify two people that are in a certain proximity from each other. Thus, the access point 210 may be able to decern the fourth person 250 from the second person 230 that is walking to their desk. As a result, data may be associated to each detected identity within the floorplan 200.

One or more identities can have various data associated with them. In a number of embodiments, the access point 210 may access an external device to gather data associated with each identity. By way of a non-limiting example, the access point 210 may detect the fourth person through radio signal capture and processing but may also receive one or more wireless signals associated with a mobile computing device (e.g., a smartphone) from that same location. As a result, a marker or tag can be associated with the detected fourth person 250. This identity data can be stored such that any additional data captured by the access point 210 may be further associated with this identity that utilizes that particular mobile computing device.

Additional data may be gathered such as historical data, that may be utilized not only what identity is within the floorplan 200, but where they may also be going next. In a further example, the access point 210 (or other external device, such as an EOD) can access calendar data associated with the fourth person 250. The calendar data may be parsed such that it is determined that the fourth person 250 has accepted an invitation to a meeting outside of the floorplan 200 that is due to start shortly. As a result, the access point 210, or EOD may predict that the fourth person 250 is likely to leave the floorplan 200 in the next few minutes. In additional embodiments, the access point 210 or EOD may determine that the second person 230 is more than likely to go to his desk since that is where their workstation is and where they walk to more often throughout the day.

Although a specific embodiment is described above with respect to FIG. 2, any of a variety of systems and/or processes may be utilized in accordance with embodiments of the disclosure. For example, the access point 210 or EOD may generate a reduced power configuration in response to one or more heuristic rules, or may, in additional embodiments, utilize one or more machine learning methods. The aspects described in FIG. 2 may also be interchangeable with other elements of FIGS. 1, and 3-9 as required to realize a particularly desired embodiment. A more detailed description of utilizing AP signals to detect motion is described below.

Figure 3:
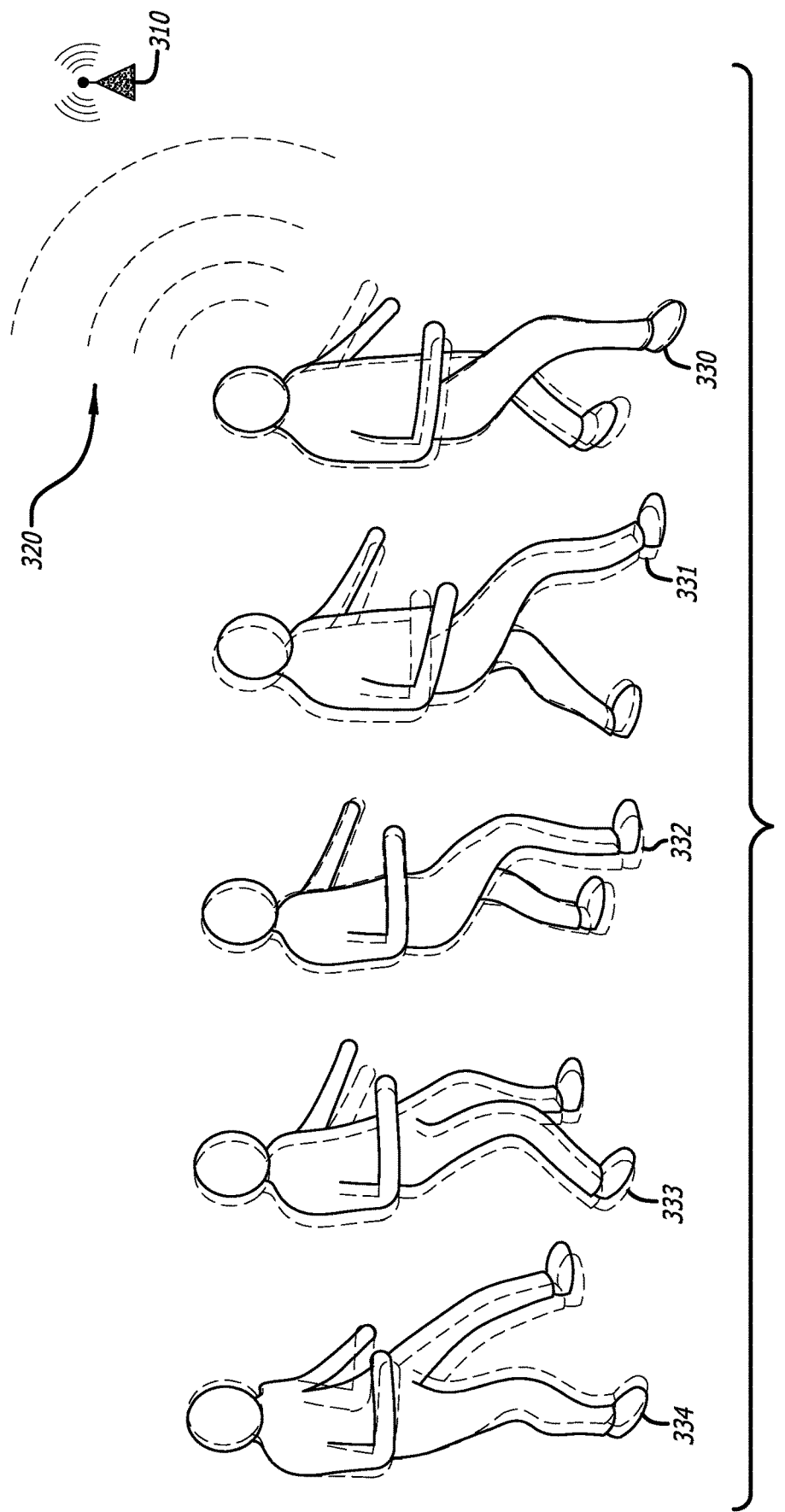
FIG. 3 is a conceptual illustration of a plurality of predicted poses of one or more identities based on collecting the reflecting signals from an access point in accordance with various embodiments of the disclosure.

Referring to FIG. 3, a conceptual illustration of a plurality of predicted poses of one or more identities based on collecting the reflecting signals 320 from an access point 310 in accordance with various embodiments of the disclosure is shown. Traditional methods of detecting motion within a space, such as a floorplan would often require the use of a series of motion detectors or a dedicated motion detection system. However, in many embodiments, utilizing various reflecting signals 320 can allow for the detection of motion within a space without the need for a dedicated motion sensing network of devices.

As described above, a floorplan may have a plurality of APs disposed across the area to provide a determined level of wireless signal coverage. These wireless signals are often radio signals emitted from a transceiver within an access point 310. While a main objective of the wireless signals is to provide wireless communication between various devices, the radio signals can physically interact with other objects within the floorplan area. For example, a person walking through the area may be irradiated by the wireless signals which are, in some portion, reflected back outwards into the area of the floorplan. The transceivers within the access point 310 may then receive these reflecting signals 320. These reflecting signals 320, once received, may be processed to generate data, such as motion data. This motion data can be utilized, and sometimes conjoined with additional data, to generate not only individual identities within the floorplan, but also to predict their movement.

Within the embodiment depicted in FIG. 3, various poses can be utilized to train a machine learning model or other device to predict motion. For example, in the first pose 330, the solid lines conceptually indicate where the access point 310 predicted the identity to be whereas the dashed outline conceptually indicates the ground truth of the pose the person actually had. Likewise, the second pose 331, third pose 332, fourth pose 333, and fifth pose 334 can conceptually illustrate a walking cycle of a person that is moving through a floorplan area. The access point 310 (or other device that is generating motion data or otherwise predicting motion) can send and receive signals periodically. This period may allow for multiple poses to be determined during a walk cycle. Thus, similar to the first pose 330, the solid lines of the second pose 331, third pose 332, fourth pose 333, and fifth pose 334 can conceptually illustrate the predicted position of the person being tracked, while the dashed outlines of the second pose 331, third pose 332, fourth pose 333, and fifth pose 334 can conceptually illustrate the ground truth of that person's location within the floorplan area. Over time, this training can provide an efficient and sufficiently accurate description of the motion of an identity through an area of a floorplan.

However, in additional embodiments, motion may be further predicted by accessing and utilizing external data stored on or otherwise available from an external device. For example, the access point 310 or other device, such as an EOD, may access data associated with a mobile computing device associated or located proximally to the tracked one or more identity. In more embodiments, data such as calendar data, historical usage data, floorplan layout data, or the like may be utilized to further predict motion within a floorplan. In certain embodiments, traditional motion detectors available in, for example, security devices, may be utilized to inform or otherwise supplement the data utilized to generate the motion predictions. In numerous embodiments, the motion prediction may be configured to predict when new identities will enter the floorplan area and to adjust the power configuration of various access points in the floorplan based on those predictions.

Although a specific embodiment is described above with respect to FIG. 3, any of a variety of systems and/or processes may be utilized in accordance with embodiments of the disclosure. For example, the access point 310 or EOD may determine that tracking motion of the one or more identities within the floorplan can be sufficiently achieved through the use of only a lower-frequency transceiver. In this way, it may be desirable to power down or reduce the usage of a higher-frequency transceiver in order to save energy. The aspects described in FIG. 3 may also be interchangeable with other elements of FIGS. 1-2, and 4A-9 as required to realize a particularly desired embodiment. An example of applying a reduced power configuration within a floorplan is described below.

Figure 4B:
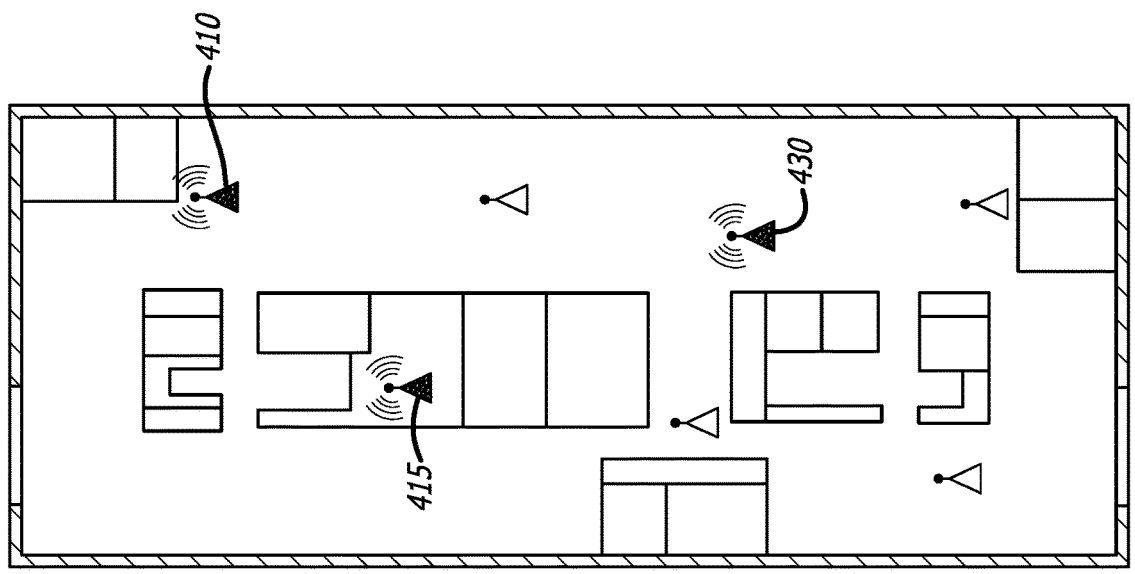
FIG. 4B is a conceptual illustration of a floorplan with a reduced power configuration applied to the plurality of access points sufficient to retain the tracking of motion of one or more identities in accordance with various embodiments of the disclosure.
Figure 4A:
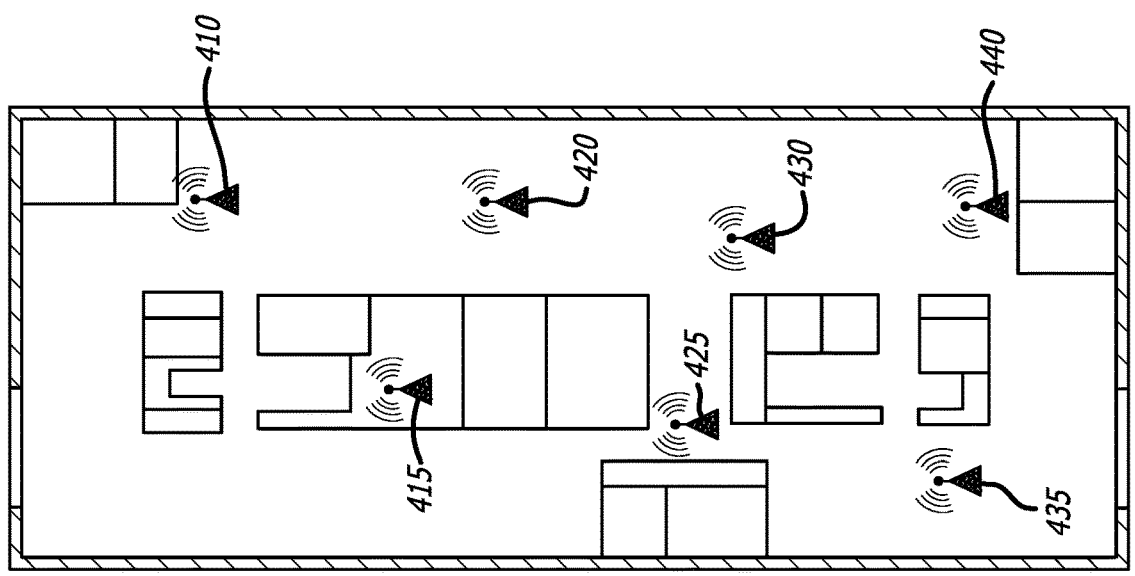
FIG. 4A is a conceptual illustration of a floorplan with a plurality of access points capable of tracking motion of one or more identities in accordance with various embodiments of the disclosure.

Referring to FIG. 4A, a conceptual illustration of a floorplan 400 with a plurality of access points capable of tracking motion of one or more identities in accordance with various embodiments of the disclosure is shown. In many embodiments, a floorplan 400 can be configured with different access points to provide wireless network coverage over a large area within the floorplan, if not the entire floorplan. In the embodiment depicted in FIG. 4A, the floorplan 400 has a first access point 410, a second access point 415, a third access point 420, a fourth access point 425, a fifth access point 430, a sixth access point 435, and a seventh access point 440. Each of these access points are fully powered on at all times during traditional networking setups. However, during periods of low traffic/bandwidth usage, or when only a few to no people are present within the floorplan 400, this fully powered setup can be inefficient.

Thus, there may be a desire to power down one or more APs and/or transceivers within the APs. An AP or and EOD may be configured to gather relevant data and generate a reduced power configuration for the floorplan that can be transmitted to all APs associated with the floorplan to achieve this lower-energy-using state. However, based on one or more events or after a predetermined amount of time, a reassessment may occur to determine if the reduced power configuration for the floorplan needs to be adjusted. In certain embodiments, one or more APs may be kept on a lower-power state at one or more entryways into the floorplan area. In this way, motion may be detected through one or more lower-frequency radio transceivers.

Referring to FIG. 4B, a conceptual illustration of a floorplan 450 with a reduced power configuration applied to the plurality of access points sufficient to retain the tracking of motion of one or more identities in accordance with various embodiments of the disclosure is shown. In many embodiments, the floorplan 450 depicted in FIG. 4B is similar to the floorplan 400 of FIG. 4A, but has a reduced power configuration applied. This reduced power configuration in FIG. 4B results in the first access point 410, second access point 415, and fifth access point 430 remaining active while the remaining APs are powered down.

In some embodiments, the reduced power configuration can be designed to provide coverage over a majority of the floorplan 450. Thus, the selection of active APs can be spread out of the floorplan 450. In this configuration, a user with a client device may still be able to connect to the wireless network at most any location within the floorplan 450. However, since there is a reduced traffic usage because of the low number of users, the lower number of access points can be sufficient to achieve proper SLA levels or user experience needs.

As described above, an AP may be selected to remain powered on, or to have at least a lower-frequency transceiver active near an entrance to the area of the floorplan 450. For example, the second access point 415 may be deployed near an elevator bay which may allow for new people to enter the area. Thus, when a sufficient amount of new users is detected in the area and/or a certain amount of network traffic is being utilized, the reduced power configuration may be updated to power on one or more additional APs. Predicted motion may be utilized, such as matching up a device being used by an identity being tracked with a workstation in a known location within the floorplan 450, to power on APs along the way sufficient to maintain SLA levels and/or user experiences.

In a variety of embodiments, the lower-frequency radio may be utilized to detect motion within the floorplan 450. When the lower-frequency radio transceiver detects that motion is occurring based on the processing of the received signals, the AP may power up a higher-frequency transceiver to validate the detected motion. Since higher-frequency transceiver signals often provide more detailed data, a more confident determination of motion may be made. If the motion is verified, some embodiments can then direct the AP to send a signal to an EOD or other device configured to generate reduced power configurations. The current reduced power configuration may then be updated and rebroadcast out to the APs within the floorplan 450.

Although specific embodiments are described above with respect to FIGS. 4A and 4B, any of a variety of systems and/or processes may be utilized in accordance with embodiments of the disclosure. For example, the access points may be directed to only turn off one or more transceivers associated with higher-power usage. The aspects described in FIGS. 4A and 4B may also be interchangeable with other elements of FIGS. 1-3, and 5-9 as required to realize a particularly desired embodiment. A transferring AP power configurations in response to tracked motion is described below.

Figure 5:
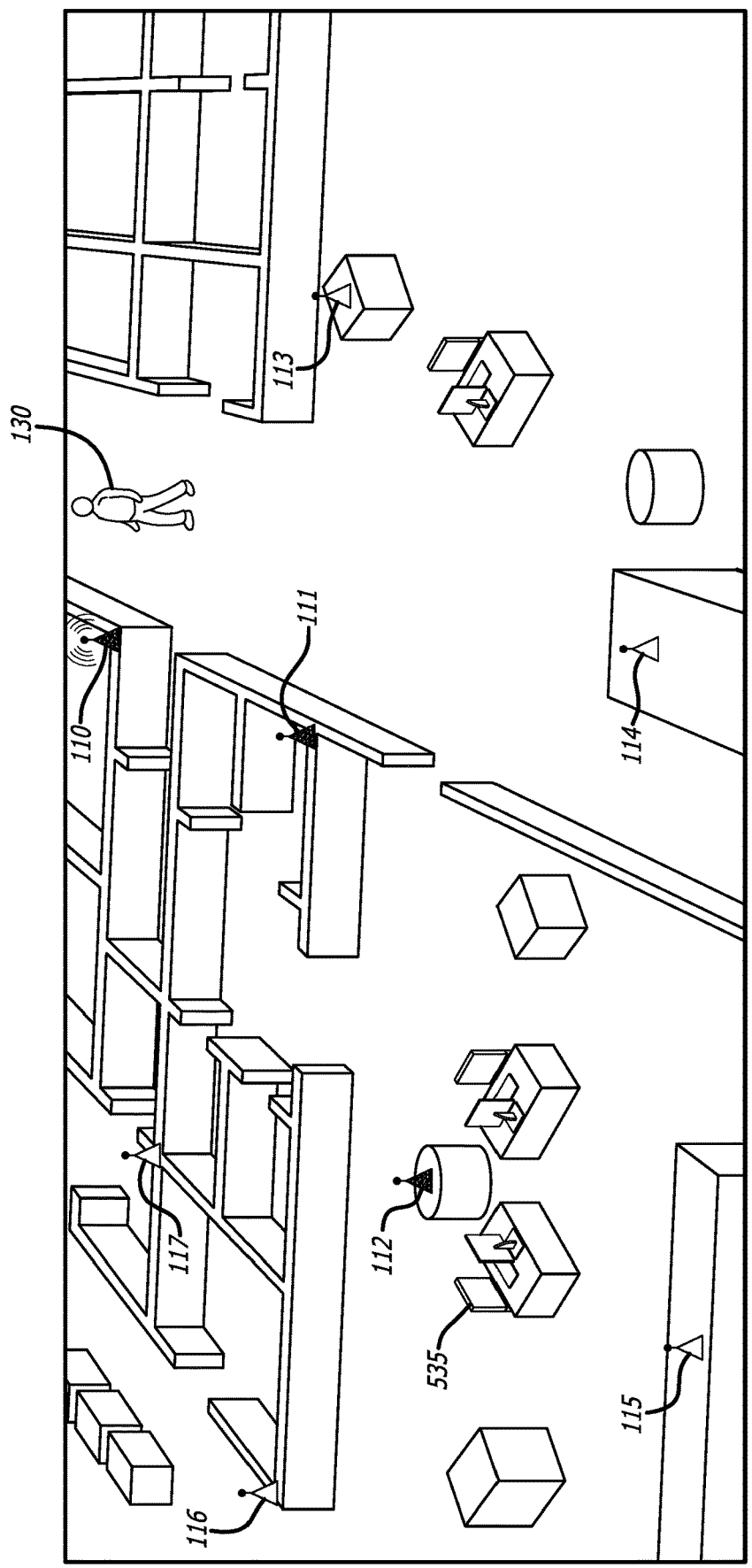
FIG. 5 is a conceptual illustration of a floorplan with a plurality of access points being configured by a dynamic reduced power configuration based on the predicted pattern of motion of an identity in accordance with various embodiments of the disclosure.

Referring to FIG. 5, a conceptual illustration of a floorplan with a plurality of access points being configured by a dynamic reduced power configuration based on the predicted pattern of motion of an identity in accordance with various embodiments of the disclosure is shown. In many embodiments, a floorplan may be configured with APs, such as in an office environment. These environments may have low usage hours, such as at night or on the weekends. During these times, a reduced power configuration may be applied such that only a minimal amount of APs are powered on. In some embodiments, when no people are detected within the floorplan area, only APs by entrances may be powered on, or powered on only with a lower-frequency transceiver that is configured to detect motion of a person entering the floorplan.

In the embodiment depicted in FIG. 5, a floorplan has a first access point 110 that is by the entrance to the floorplan. This can be similar to the floorplan depicted in FIG. 1. The second person 130 has entered the floorplan area. The first access point 110 has detected the second person 130 through a lower-frequency transceiver, which may have been verified by powering on and using a higher-frequency transceiver. The AP or an EOD that is configured to generate and update reduced power configurations may be able to identify the second person 130. In certain embodiments, the second person 130 may have a mobile phone that is connected to the first access point 110 through a wireless communication protocol. The first access point 110 may be able to match the device with the second person 130 through previously stored identity data.

Upon matching the detected motion with the second person 130, the first access point 110 can determine the predicted motion of the second person 130. In further embodiments, the first access point 110 transmits the motion data to an EOD that can match the detected motion to the identity data associated with the second person 130. The first access point 110 or EOD may determine that the second person 130 is likely to go to their workstation 535 within the floorplan area. As a result, the first access point 110, EOD, or other device configured to generate and/or update reduced power configurations may direct the second access point 111 to power on to make sure the next area the second person 130 will walk through has wireless signal coverage.

Subsequently, the first access point 110, EOD, or other device configured to generate and/or update reduced power configurations may direct the third access point 112 to power on in order to provide wireless network coverage in the area of the workstation 535 the second person 130 is most likely to walk toward. The remaining access points, such as the fourth access point 113, fifth access point 114, sixth access point 115, seventh access point 116, and eighth access point 117 are all directed to remain powered down during this movement of the second person 130.

Although a specific embodiment is described above with respect to FIG. 5, any of a variety of systems and/or processes may be utilized in accordance with embodiments of the disclosure. For example, the access points may be directed to only turn on one or more transceivers associated with higher-power usage. In the example shown in the embodiment of FIG. 5, the second access point 111 may only be directed to power on a lower-frequency transceiver since it is predicted that the second person 130 will only walk past that area on the way to their workstation 535. The aspects described in FIG. 5 may also be interchangeable with other elements of FIGS. 1-4B, and 6-9 as required to realize a particularly desired embodiment. Flowcharts describing these processes in more detail are described below.

Figure 6:
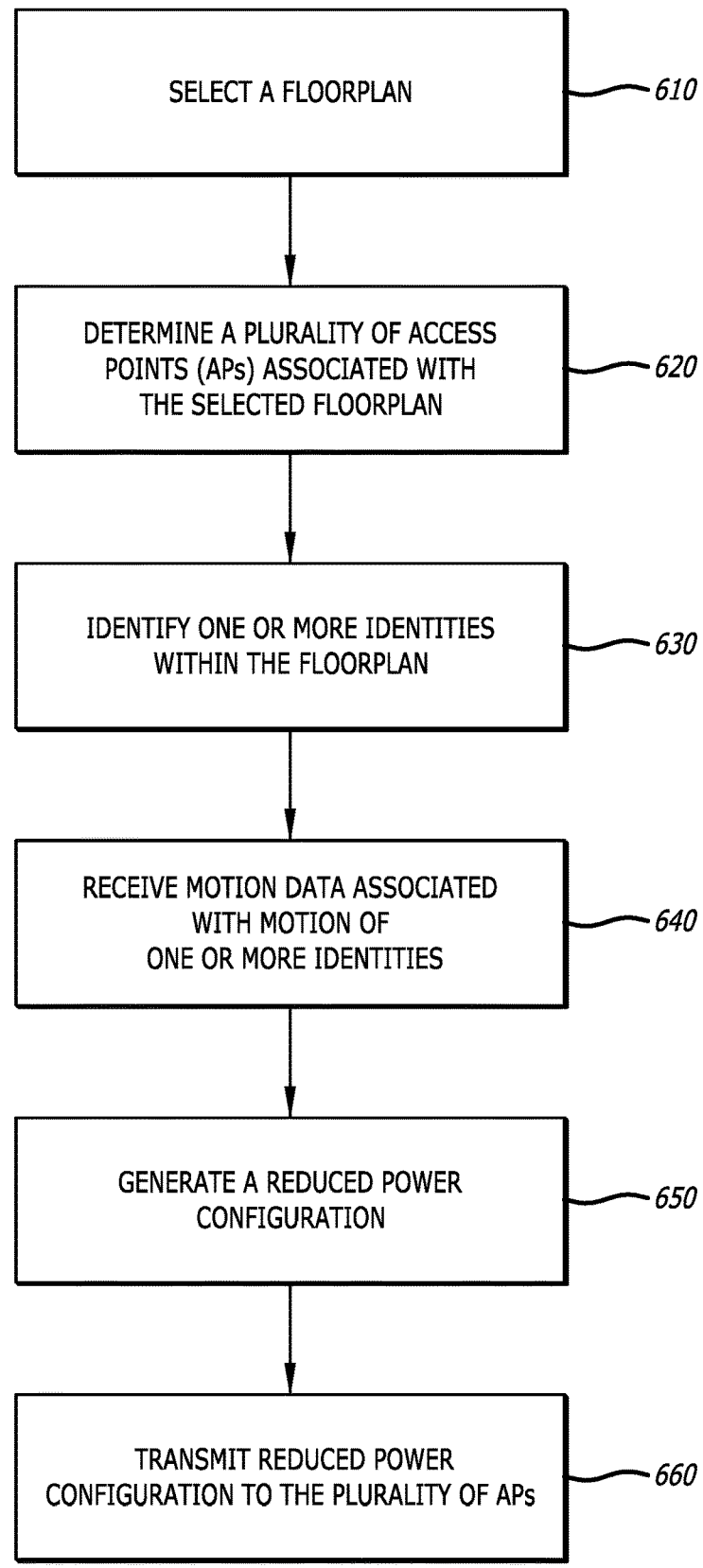
FIG. 6 is a flowchart depicting a process for generating and transmitting reduced power configurations in accordance with various embodiments of the disclosure.

Referring to FIG. 6, a flowchart depicting a process 600 for generating and transmitting reduced power configurations in accordance with various embodiments of the disclosure is shown. In many embodiments, the process 600 can select a floorplan, such as a floorplan in an environment (block 610). The floorplan may be any area that has a deployed array or plurality of APs. Indeed, various embodiments of the process 600 can determine a plurality of APs associated with the selected floorplan (block 620). It is contemplated that an AP may be associated with multiple floorplans and that decisions may be generated for that AP when processing each of the associated floorplans.

In more embodiments, the process 600 can identify one or more identities within the floorplan (block 630). Often, one or more identities may be people within the floorplan, such as, but not limited to, an office space. However, it is contemplated that one or more identities may be assigned to other items that are desired to be tracked. Over time, the one or more identities may move throughout the floorplan. In a number of embodiments, the process 600 can receive motion data associated with motion of the one or more identities (block 640). As discussed in more detail below, this may be from signals transmitted and received by the AP.

Based on the received motion data, the process 600 may generate a reduced power configuration (block 650). In further embodiments, that reduced power configuration may be transmitted to the plurality of APs associated with the floorplan (block 660). However, in certain embodiments, the AP itself may generate a reduced power configuration and utilize it without the need to receive a reduced power configuration form an external source.

Although a specific embodiment for a process 600 to generate and/or transmit reduced power configurations to APs is described above with respect to FIG. 6, any of a variety of systems and/or processes may be utilized in accordance with embodiments of the disclosure. For example, the process 600 may generate the reduced power configuration in response to one or more heuristic rules, or may, in additional embodiments, utilize one or more machine learning methods. The aspects described in FIG. 6 may also be interchangeable with other elements of FIGS. 1-5, and 7-9 as required to realize a particularly desired embodiment. A more detailed method for generating and updating a reduced power configuration for APs is described below.

Figure 7:
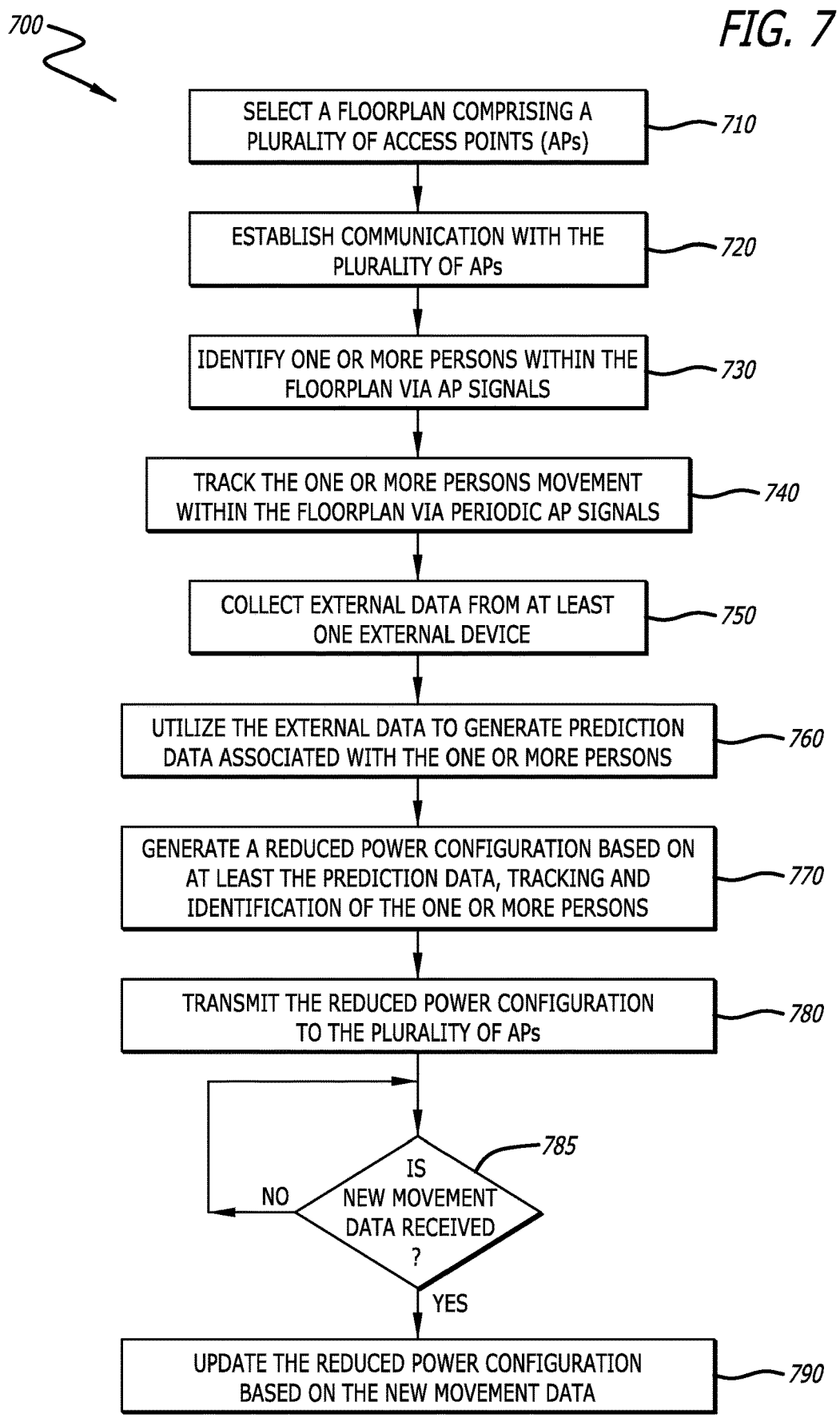
FIG. 7 is a flowchart depicting a process for generating and updating reduced power configurations in accordance with various embodiments of the disclosure.

Referring to FIG. 7, a flowchart depicting a process 700 for generating and updating reduced power configurations in accordance with various embodiments of the disclosure is shown. In many embodiments, the process can select a floorplan comprising a plurality of APs (block 710). Upon selection, the process 700 may establish communication with the plurality of APs (block 720). While not necessary, the communication can often be established through one or more wireless communication protocols. In more embodiments, the process 700 can identify one or more persons within the floorplan via AP signals (block 730).

While the process 700 depicted in FIG. 7 teaches of identifying persons, it is contemplated that a variety of identities can be identified. In some embodiments, the identities may be individual identities. Identities may include persons but may also include other bodies in motion within a floorplan. For example, some embodiments may have one or more robots, drones, or autonomous mechanical devices that can move throughout the floorplan which can be identified and tracked. It is also contemplated that these identities may be grouped together for tracking purposes by category, energy use, motion, known vs. unknown, etc. When tracking persons, a mobile computing device (i.e., a smart phone) may be in wireless communication with the AP and can be associated with the person such that the presence of the specific mobile computing device can indicate the presence of a particular person. Likewise, other robots, drones, etc., may also be in wireless communication with an AP within the floorplan and can be used to identify the device.

As described in more detail above, the plurality of APs can be configured to emit various signals that can be received back and processed to gather data. That data may be utilized through one or more methods or processes to identify one or more identities such as people within an area proximate to the APs. In additional embodiments, the process 700 can track the one or more person's movement within the floorplan via periodic AP signals (block 740). Although AP devices are often utilized to receive and transmit signals throughout the day, they may sometimes be in a state that limits or otherwise reduced signal emission. Thus, APs may be configured to periodically emit signals that can allow for the tracking of movement of people within a floorplan.

In further embodiments, the process 700 can collect external data from at least one external device (block 750). Often, the movement of people within a floorplan can be better predicted by utilizing external data. By way of non-limiting example, the process 700 may access external calendar data from an external calendar server device. That calendar data may include various meetings where certain people are scheduled to attend. Thus, with this data, the process 700 may generate predictions associated with the one or more persons being tracked (block 760). However, it is contemplated that other data may be accessed from various external devices to generate predictions of movement of tracked people.

This predicted movement may also allow for a potential reduction in AP power. For example, if a meeting is being held on one end of the floorplan, APs on the other side of the floorplan may not need to use their full power to track people as they may not be around that end of the floorplan. Based on this knowledge, the process 700 may generate a reduced power configuration by utilizing at least the prediction data, the tracking data, and/or the identity of the tracked persons (block 770). However, in certain embodiments, the generation of the reduced power configuration may be accomplished using only a subset of the available data.

In a number of embodiments, the process 700 can transmit the reduced power configuration to the plurality of APs (block 780). This can be done wirelessly in many embodiments. Over time, the tracked persons may move again, or additional people may enter and/or leave the floorplan area. As a result, additional movement data may be generated from the APs. Thus, the process 700 may determine if any new movement data is received from the APs (block 785). If no movement data is received, the process 700 continue to monitor for additional movement data. However, if new movement data is received, then the process 700 can update the reduced power configuration based on the new movement data (block 790). It is contemplated that subsequent to updating the reduced power configuration, the process 700 continue to monitor for new movement data, although that is not necessary for all embodiments.

Although a specific embodiment for a process 700 to generate and/or update reduced power configurations to APs is described above with respect to FIG. 7, any of a variety of systems and/or processes may be utilized in accordance with embodiments of the disclosure. For example, the process 700 may monitor for new movement data at various intervals. In some embodiments, the process 700 can direct the APs to transmit movement data at a predetermined interval. The aspects described in FIG. 7 may also be interchangeable with other elements of FIGS. 1-6, and 8-9 as required to realize a particularly desired embodiment. A description of processing reduced power configurations, such as by APs, is described below.

Figure 8:
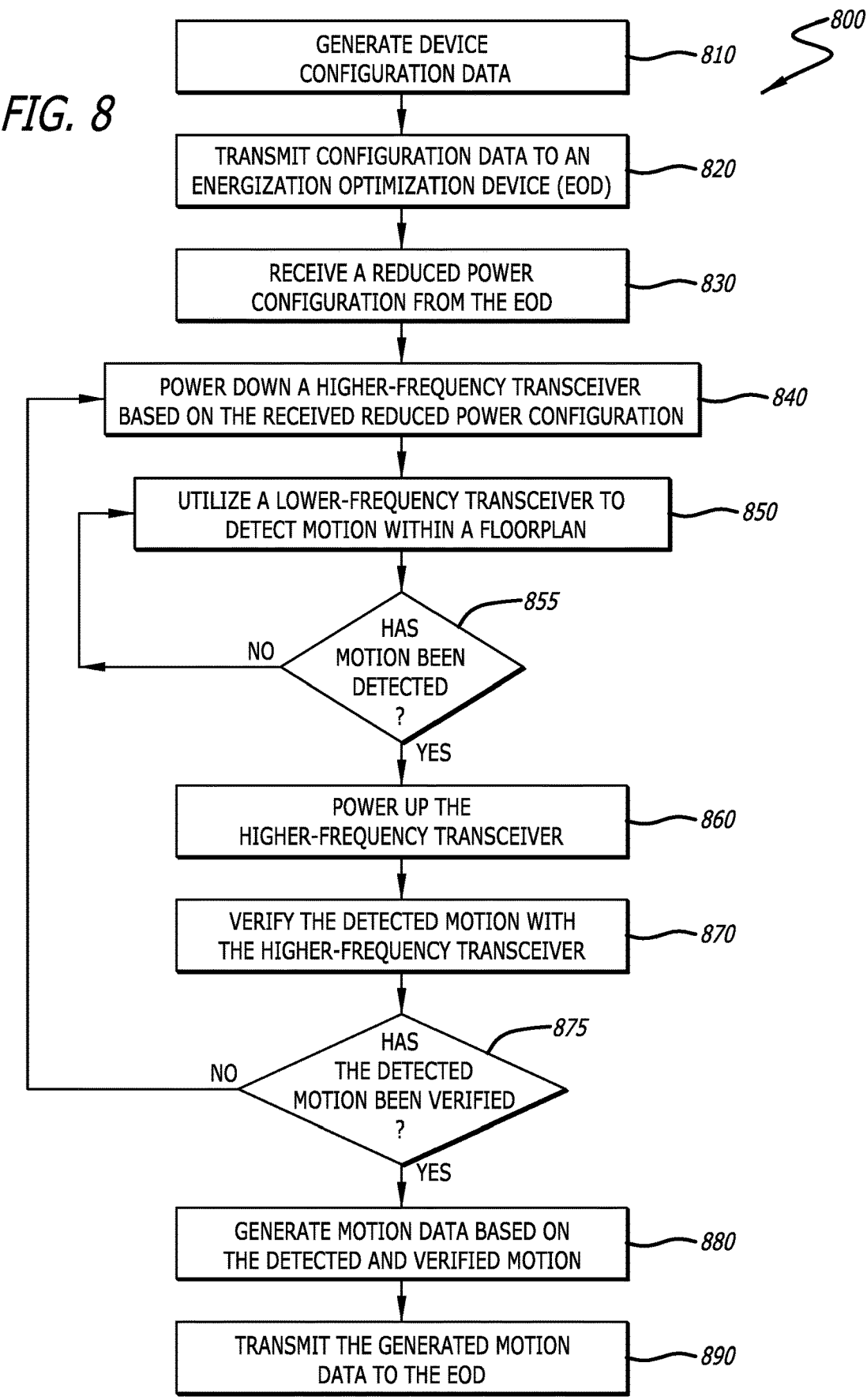
FIG. 8 is a flowchart depicting a process for receiving and utilizing reduced power configurations in accordance with various embodiments of the disclosure.

Referring to FIG. 8, a flowchart depicting a process 800 for receiving and utilizing reduced power configurations in accordance with various embodiments of the disclosure is shown. In many embodiments, the process 800 can generate device configuration data (block 810). The device configuration data may relate to an AP and may include various current states, power-saving configurations, etc. In more embodiments, the process 800 can transmit the configuration data to an energization optimization device (EOD) (block 820). This may often be done wirelessly but is not necessary in all embodiments.

In response, the process 800 may receive a reduced power configuration from the EOD (block 830). As discussed above, the reduced power configuration may include directives to power down an AP, to power down one or more bands of transceivers within an AP, to select one or more power-saving configurations, or actions to take that could increase sustainability metrics. In a number of embodiments, the process 800 can power down a higher-frequency transceiver based on the received reduced power configuration (block 840). For example, a 5 GHz transceiver may be using more electricity than a 2.4 GHz transceiver in some embodiments. However, in certain embodiments, the 2.4 GHz and 5 GHz transceivers can be selected for powering down while a specialized or otherwise relatively lower-frequency transceiver remains powered on. If the 5 GHz transceiver is not directly needed to sustain the SLA or other user experience, it may be powered down to save electricity.

Upon powering down, the process 800 may utilize a lower-frequency transceiver to detect motion within a floorplan (block 850). In certain embodiments, an AP may be equipped with a specialized sensor or lower-frequency transceiver that is configured to work primarily to detect motion. Once utilized, the process 800 can determine if motion has been detected (block 855). If no motion is detected, the process 800 can continue to utilize the lower-frequency transceiver to detect motion within a floorplan (block 850). However, when motion is detected, the process 800 can power up the higher-frequency transceiver again (block 860).

In numerous embodiments, the higher-frequency transceiver can provide a more granular (i.e., detailed) assessment of the area surrounding an AP. Thus, the process 800 can verify the detected motion with the higher-frequency transceiver (block 870). In additional embodiments, this can be done by transmitting signals over a predetermined interval that are reflected back and received by the transceiver. Thus, the process 800 can determine if the detected motion has been verified (block 875). When the detected motion has not been verified, the process 800 can again power down the higher-frequency transceiver congruent to the previously received reduced power configuration (block 840).

However, in various embodiments, when the detected motion has been verified, the process 800 can generate motion data based on the detected and verified motion (block 880). This motion data can indicate the direction of movement, the speed of movement, the identity/identities doing the movement, etc. Once generated, the process 800 can transmit generated motion data to the EOD (block 890). Often, the EOD may generate a new reduced power configuration and send it back to the transmitting device. However, it is further contemplated that the process 800 may transmit the movement data to other devices such as other APs which may be in better communication with the EOD and/or can congregate the data for pre-processing and/or batch delivery.

Although a specific embodiment for a process 800 to receive and process reduced power configurations is described above with respect to FIG. 8, any of a variety of systems and/or processes may be utilized in accordance with embodiments of the disclosure. For example, the process 800 may monitor for new movement data at various intervals. In some embodiments, the process 800 can detect movement across multiple APs to reduce false positives. Finally, many embodiments may comprise a higher and lower power transceiver and may operate steps within the process 800 by powering and/or detecting via the higher and/or lower power transceiver(s). The aspects described in FIG. 8 may also be interchangeable with other elements of FIGS. 1-7, and 9 as required to realize a particularly desired embodiment. A description of a device suitable for use within these systems and processes is described below.

Figure 9:
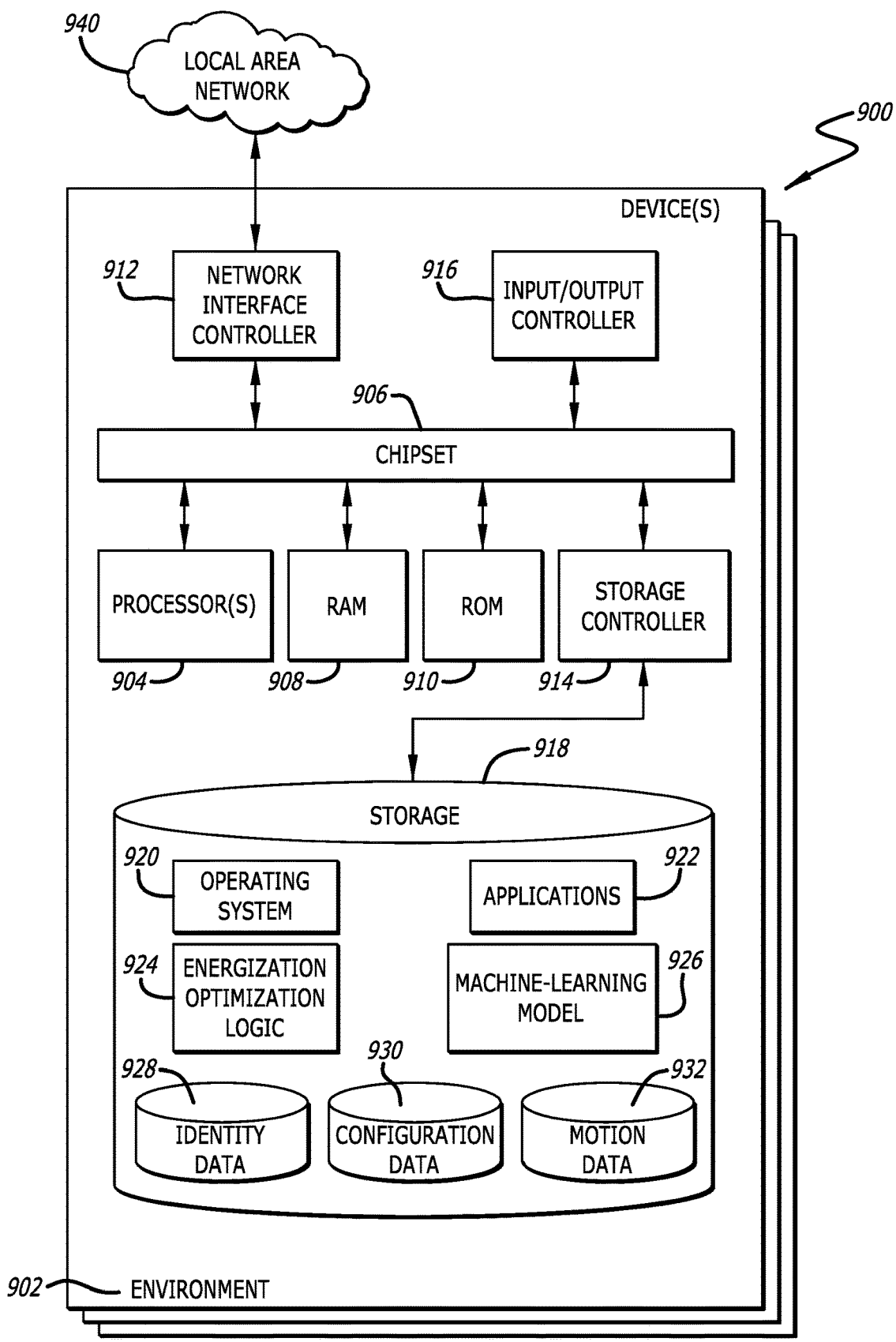
FIG. 9 is a conceptual block diagram of a device suitable for use in a minimally selective transceiver energization system in accordance with various embodiments of the disclosure.

Referring to FIG. 9, a conceptual block diagram of a device 900 suitable for use in a minimally selective transceiver energization system in accordance with various embodiments of the disclosure is shown. The embodiment of the conceptual block diagram depicted in FIG. 9 can illustrate an access point, conventional server computer, workstation, desktop computer, laptop, tablet, network appliance, e-reader, smartphone, or other computing device, and can be utilized to execute any of the application and/or logic components presented herein. The device 900 may, in some examples, correspond to physical devices or to virtual resources described herein.

In many embodiments, the device 900 may include an environment 902 such as a baseboard or "motherboard," in physical embodiments that can be configured as a printed circuit board with a multitude of components or devices connected by way of a system bus or other electrical communication paths. Conceptually, in virtualized embodiments, the environment 902 may be a virtual environment that encompasses and executes the remaining components and resources of the device 900. In more embodiments, one or more processors 904, such as, but not limited to, central processing units ("CPUs") can be configured to operate in conjunction with a chipset 906. The processor(s) 904 can be standard programmable CPUs that perform arithmetic and logical operations necessary for the operation of the device 900.

In additional embodiments, the processor(s) 904 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In certain embodiments, the chipset 906 may provide an interface between the processor(s) 904 and the remainder of the components and devices within the environment 902. The chipset 906 can provide an interface to a random-access memory ("RAM") 908, which can be used as the main memory in the device 900 in some embodiments. The chipset 906 can further be configured to provide an interface to a computer-readable storage medium such as a read-only memory ("ROM") 910 or non-volatile RAM ("NVRAM") for storing basic routines that can help with various tasks such as, but not limited to, starting up the device 900 and/or transferring information between the various components and devices. The ROM 910 or NVRAM can also store other application components necessary for the operation of the device 900 in accordance with various embodiments described herein.

Different embodiments of the device 900 can be configured to operate in a networked environment using logical connections to remote computing devices and computer systems through a network, such as the local area network 940. However, it is contemplated that the device 900 may communicate over a wide-area network or other network type. The chipset 906 can include functionality for providing network connectivity through a network interface card ("NIC") 912, which may comprise a gigabit Ethernet adapter or similar component. The NIC 912 can be capable of connecting the device 900 to other devices over the local area network 940. It is contemplated that multiple NICs 912 may be present in the device 900, connecting the device to other types of networks and remote systems.

In further embodiments, the device 900 can be connected to a storage 918 that provides non-volatile storage for data accessible by the device 900. The storage 918 can, for example, store an operating system 920, applications 922, and data, which are described in greater detail below. The storage 918 can be connected to the environment 902 through a storage controller 914 connected to the chipset 906. In certain embodiments, the storage 918 can consist of one or more physical storage units. The storage controller 914 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The device 900 can store data within the storage 918 by transforming the physical state of the physical storage units to reflect the information being stored. The specific transformation of physical state can depend on various factors. Examples of such factors can include, but are not limited to, the technology used to implement the physical storage units, whether the storage 918 is characterized as primary or secondary storage, and the like.

For example, the device 900 can store information within the storage 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 900 can further read or access information from the storage 918 by detecting the physical states or characteristics of one or more particular locations within the physical storage units.

In addition to the storage 918 described above, the device 900 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 900. In some examples, the operations performed by a cloud computing network, and or any components included therein, may be supported by one or more devices similar to device 900. Stated otherwise, some or all of the operations performed by the cloud computing network, and or any components included therein, may be performed by one or more devices 900 operating in a cloud-based arrangement.

By way of example, and not limitation, computer-readable storage media can include volatile and non-volatile, removable, and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 918 can store an operating system 920 utilized to control the operation of the device 900. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 918 can store other system or application programs and data utilized by the device 900.

In various embodiment, the storage 918 or other computer-readable storage media is encoded with computer-executable instructions which, when loaded into the device 900, may transform it from a general-purpose computing system into a special-purpose computer capable of implementing the embodiments described herein. These computer-executable instructions may be stored as one or more applications 922 and transform the device 900 by specifying how the processor(s) 904 can transition between states, as described above. In some embodiments, the device 900 has access to computer-readable storage media storing computer-executable instructions which, when executed by the device 900, perform the various processes described above with regard to FIGS. 1-8. In more embodiments, the device 900 can also include computer-readable storage media having instructions stored thereupon for performing any of the other computer-implemented operations described herein.

In still further embodiments, the device 900 can also include one or more input/output controllers 916 for receiving and processing input from a number of input devices, such as a keyboard, a mouse, a touchpad, a touch screen, an electronic stylus, or other type of input device. Similarly, an input/output controller 916 can be configured to provide output to a display, such as a computer monitor, a flat panel display, a digital projector, a printer, or other type of output device. Those skilled in the art will recognize that the device 900 might not include all of the components shown in FIG. 9 and can include other components that are not explicitly shown in FIG. 9, or might utilize an architecture completely different than that shown in FIG. 9.

As described above, the device 900 may support a virtualization layer, such as one or more virtual resources executing on the device 900. In some examples, the virtualization layer may be supported by a hypervisor that provides one or more virtual machines running on the device 900 to perform functions described herein. The virtualization layer may generally support a virtual resource that performs at least a portion of the techniques described herein.

In many embodiments, the device 900 can include an energization optimization logic 924. The energization optimization logic 924 may be configured to carry out various processes and/or methods described above. In certain embodiments, the energization optimization logic 924 may be disposed within an EOD which may generate and transmit configuration data 930 to various APs within a floorplan area. In more embodiments, the energization optimization logic 924 can be configured within an AP which can receive configuration data 930 in the form of reduce power configuration data which can then be parsed to direct the powering down of one or more transceivers within the AP. In additional embodiments, the energization optimization logic 924 can be utilized to direct and/or train the machine-learning model 926. This can include generating and formatting input data for the machine-learning model 926 and subsequently receiving and processing the output data.

In a number of embodiments, the storage 918 can include identity data 928. Identity data 928 may include the currently tracked one or more identities within a given floorplan associated with the device 900. In further embodiments, the identity data 928 can include or be supplemented by external data associated with one or more identities within the identity data 928. By utilizing identity data 928, processed motion data 932 can be associated to one or more identities within a floorplan area. This can allow for the tracking of motion and the prediction of future motion.

In various embodiments, the storage 918 can include configuration data 930. As described above, configuration data 930 can include reduced power configuration data. In more embodiments, this configuration data 930 can include one or more transceivers to power down in response to tracked motion and/or predicted motion of one or more identities within the floorplan. In additional embodiments, the configuration data 930 can include one or more energy-saving configurations that can be turned on or off within a network device such as, but not limited to, an AP. The configuration data 930 can be updated periodically or in response to certain events, such as the receiving of updated motion data 932.

In still more embodiments, the storage 918 can include motion data 932. The motion data 932 may be configured to include the tracked motion of one or more identities within a floorplan. In more embodiments, the motion data 932 can include predicted motions of identities based off of historical usage or personal knowledge of the tracked subject. The predicted motion can be utilized to update or inform the generation of configuration data 930. In further embodiments, additional motion data 932 may be received by the device 900 which can be utilized to direct an update to the configuration data 930. In this way, tracked identities that are still moving may trigger additional power considerations.

Finally, in many embodiments, data may be processed into a format usable by a machine-learning model 926 (e.g., feature vectors), and or other pre-processing techniques. The machine-learning ("ML") model 926 may be any type of ML model, such as supervised models, reinforcement models, and/or unsupervised models. The ML model 926 may include one or more of linear regression models, logistic regression models, decision trees, Naïve Bayes models, neural networks, k-means cluster models, random forest models, and/or other types of ML models 926. The ML model 926 may be configured to generate predictions of movement. In various embodiments, the ML model 926 can make decisions on which tracked identity is associated with each person, account, or other data.

Although a specific embodiment for a device 900 configured to carry out the processes and/or methods described herein is described above with respect to FIG. 9, any of a variety of devices may be utilized in accordance with embodiments of the disclosure. For example, the device 900 may be utilized as a specialized device, such as an EOD. However, other embodiments may be operating the energization optimization logic within one of the APs located within a floorplan, etc. The aspects described in FIG. 9 may also be interchangeable with other elements of FIGS. 1-8 as required to realize a particularly desired embodiment.

Information as herein shown and described in detail is fully capable of attaining the above-described object of the present disclosure, the presently preferred embodiment of the present disclosure, and is, thus, representative of the subject matter that is broadly contemplated by the present disclosure. The scope of the present disclosure fully encompasses other embodiments that might become obvious to those skilled in the art, and is to be limited, accordingly, by nothing other than the appended claims. Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, work-piece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device, comprising:
   a processor;
   a memory communicatively coupled to the processor; and
   an energization optimization logic, configured to:
      select a floorplan;
      determine a plurality of access points associated with the selected floorplan, wherein the plurality of access points have an energy consumption associated with a signal transmission;
      identify one or more identities located within the floorplan;
      track a motion of the one or more identities within the floorplan;
      determine a reduced power configuration for the floorplan; and
      reduce the energy consumption of one or more of the plurality of access points based on the determined reduced power configuration such that the tracked motion of the one or more identities is retained.

2. The device of claim 1, wherein determining motion within the floorplan comprises:
   transmitting a plurality of signals into a space associated with the floorplan;
   collecting reflected signals; and
   analyzing the reflected signals for motion.

3. The device of claim 1, wherein the reduction of energy consumption of the one or more of the plurality of access points includes powering the one or more access points off.

4. The device of claim 3, wherein the one or more powered off access points are configured to periodically power on and track motion within the floorplan.

5. The device of claim 4, wherein the energization optimization logic is further configured to:
   predict a pattern of motion of the one or more identities; and
   determine a reduced power configuration based on the predicted pattern of motion.

6. The device of claim 5, wherein:
   the floorplan includes one or more entrance areas with at least one access point disposed with a coverage area covering the one or more entrances; and
   the reduced power configuration is configured to maintain power in the at least one access point covering the one or more entrances.

7. The device of claim 1, wherein the determination of the reduced power configuration is based on at least one or more machine learning processes.

8. The device of claim 7, wherein the one or more machine learning processes utilizes identity data associated with a particular identity.

9. The device of claim 8, wherein the identity data is received from a second device.

10. The device of claim 1, wherein the one or more access points are configured with a lower-frequency transceiver and a higher-frequency transceiver.

11. The device of claim 10, wherein the reduced power configuration includes powering off the higher-frequency transceiver.

12. The device of claim 11, wherein the higher-frequency transceiver can subsequently be powered on in response to a detection of motion by the lower-frequency transceiver.

13. A method, comprising:
   selecting a floorplan for energization optimization;
   determining a plurality of access points associated with the selected floorplan wherein the plurality of access points have an energy consumption associated with a signal transmission;
   identifying one or more identities located within the floorplan;
   tracking a motion of the one or more identities within the floorplan;
   determining a reduced power configuration for the floorplan; and
   reducing the energy consumption of one or more of the plurality of access points based on the determined reduced power configuration such that the tracking of the one or more identities is retained.

14. The method of claim 13, wherein determining motion within the floorplan comprises:
   transmitting a plurality of signals into a space associated with the floorplan;
   collecting reflected signals; and
   analyzing the reflected signals for motion.

15. The method of claim 13, wherein the reduction of energy consumption of the one or more of the plurality of access points includes powering the one or more access points off.

16. The method of claim 15, wherein the method is further configured to:
   predict a pattern of motion of the one or more identities; and
   determine a reduced power configuration based on the predicted pattern of motion.

17. The method of claim 13, wherein the one or more of the plurality of access points are configured with a lower-frequency transceiver and a higher-frequency transceiver.

18. The method of claim 17, wherein the reduced power configuration includes powering off the higher-frequency transceiver.

19. The method of claim 18, wherein the higher-frequency transceiver can subsequently be powered on in response to a detection of motion by the lower-frequency transceiver.

20. A device, comprising:
- a processor;
- a memory communicatively coupled to the processor;
- a lower-power transceiver;
- a higher-power transceiver; and
- an energization optimization logic, configured to:
    - transmit to an external device:
        - device configuration data; and
        - historical usage data;
    - receive a reduced power configuration;
    - power down the higher-power transceiver in response to the received reduced power configuration;
    - detect motion with the lower-power transceiver;
    - power on the higher-power transceiver;
    - detect motion with the higher-power transceiver;
    - generate motion data based on the detected motion from the higher-power transceiver; and
    - transmit the generated motion data to the external device.

\* \* \* \* \*